(12) United States Patent
Accapadi et al.

(10) Patent No.: US 7,543,124 B1
(45) Date of Patent: Jun. 2, 2009

(54) METHOD FOR PREVENTING PAGE REPLACEMENT OF UNREFERENCED READ-AHEAD FILE PAGES

(75) Inventors: Mathew Accapadi, Austin, TX (US); Dirk Michel, Austin, TX (US); Andrew Dunshea, Austin, TX (US); Jos M. Accapadi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/170,218

(22) Filed: Jul. 9, 2008

(51) Int. Cl.
*G06F 12/07* (2006.01)
*G06F 12/57* (2006.01)

(52) U.S. Cl. ........................ 711/159; 711/133
(58) Field of Classification Search .............. None
See application file for complete search history.

(56) References Cited

U.S. PATENT DOCUMENTS

| | | |
|---|---|---|
| 4,277,826 A | 7/1981 | Collins et al. |
| 6,470,424 B1 | 10/2002 | Adams |
| 6,496,909 B1 | 12/2002 | Schimmel |
| 7,246,203 B2 * | 7/2007 | Moat et al. .................. 711/133 |

* cited by examiner

Primary Examiner—Hyung S. Sough
Assistant Examiner—Duc T Doan
(74) *Attorney, Agent, or Firm*—Locke Lord Bissell & Liddell, LLP

(57) ABSTRACT

A computer-implemented system, method, and program product is disclosed for managing memory pages in a memory that includes a page replacement function. The method includes detecting that a sequence of pages is read by an application into the memory. The method continues by initiating a read-ahead to access a plurality of pages including the sequence of pages and a next page that has not yet been read, and storing the plurality in a page frame table of the memory. During the read-ahead, the method sets a soft-pin bit in the page frame table corresponding to each of the pages of the plurality of pages in the read-ahead. Each the soft-pin bit temporarily reserves its respective page from replacement by the page replacement function.

1 Claim, 2 Drawing Sheets

COMPUTER 100

METHOD FOR PREVENTING PAGE REPLACEMENT OF UNREFERENCED READ-AHEAD FILE PAGES

FIELD

The embodiments relate to preventing page replacement of unreferenced read-ahead file pages.

BACKGROUND

Virtual memory is important in many modern, complex operating systems. Virtual memory is an imaginary memory area supported by some operating systems (for example, IBM's AIX™ operating system) in conjunction with the hardware. Virtual memory provides an alternate set of memory addresses. Programs use these virtual addresses rather than real addresses to store instructions and data. When the program is actually executed, the virtual addresses are converted into real memory addresses.

The purpose of virtual memory is to enlarge the address space, i.e., the set of addresses a program can utilize. For example, virtual memory might contain twice as many addresses as main memory. A program using all of virtual memory, therefore, would not be able to fit in main memory all at once. Nevertheless, the computer could execute such a program by copying into main memory those portions of the program needed at any given point during execution.

To facilitate copying virtual memory into real memory, the operating system divides virtual memory into pages, each of which contains a fixed number of addresses. Each page is stored on a disk until it is needed. When the page is needed, the operating system copies it from disk to main memory, translating the virtual addresses into real addresses.

In AIX™, virtual memory segments are partitioned into 4K (4096) byte units called pages and real memory is divided into 4K-byte page frames. The virtual memory manager (VMM) manages the allocation of page frames as well as resolving references to virtual-memory pages that are not currently in random access memory (RAM) (i.e., not currently stored in the paging space) or do not yet exist. To accomplish these tasks, the VMM maintains a "free list" of available page frames and uses a page-replacement algorithm to determine which virtual-memory pages that are currently in RAM will have their page frames reassigned to the free list (i.e., swapped out of the RAM).

Many VMMs try to anticipate when a program is sequentially reading a file from disk in order to pre-fetch pages so that subsequent pages will already be loaded into memory before being requested by the program. This anticipation performed by the VMM is often referred to as "Sequential-Access Read Ahead."

In AIX™, the VMM tries to anticipate the future need for pages of a sequential file by detecting the pattern in which a program is accessing the file. When the program access two successive pages of a file, the VMM assumes that the program will continue to access the file sequentially. Consequently, the VMM schedules additional sequential reads of the file so that the file data is available to the program sooner than if the VMM waited to initiate the file I/O until the program requested the next page from the file.

In one example implementation of sequential-access read ahead, a first access of a file from the disk causes the first page (page 0) of the file to be read. At this point the virtual memory manager (VMM) makes no assumption about random or sequential file access. If the program accesses the first byte of the next page (page 1), with no intervening accesses to other pages of the file, then VMM concludes that the program is accessing sequentially. It schedules a number of extra pages (e.g., two extra pages). In this example, two additional pages (pages 2 and 3) are read. Thus, in this example a total of 3 pages are read as a result of the program's second read request. If the program accesses the first byte of the first page that has been read ahead (page 2), the VMM doubles the page-ahead value to 4 and schedules pages 4 through 7 to be read from the file. If the program accesses the first byte of the first page that has been read ahead (page 4), the VMM again doubles the page-ahead value to 8 and schedules pages 8 through 15 to be read. This doubling continues until the amount of data being read reaches a predetermined maximum or until the end of the file is reached.

A challenge, however, to pre-fetching large numbers of sequentially-accessed pages is that the RAM memory can sometimes become constrained. When memory becomes constrained, the VMM determines which virtual-memory pages that are currently in RAM will be subjected to the page replacement function, which reassigns their page frames to the free list and swaps them out of the RAM.

When the page replacement function of the VMM steals one or more of the read-ahead pages before the application reads them, the application must wait for a physical I/O to the disk to complete for one or more of its pages, rather than just read the pre-fetched pages from memory.

SUMMARY

A computer-implemented system, method, and program product is disclosed for managing memory pages in a memory that includes a page replacement function. The method includes detecting that a sequence of pages is read by an application into the memory. The method continues by initiating a read-ahead to access a plurality of pages including the sequence of pages and a next page that has not yet been read, and storing the plurality in a page frame table of the memory. During the read-ahead, the method sets a soft-pin bit in the page frame table corresponding to each of the pages of the plurality of pages in the read-ahead. Each the soft-pin bit temporarily reserves its respective page from replacement by the page replacement function.

During a first pass of the page replacement function, the method skips the replacement of the next page by the page replacement function, if its respective soft-pin bit remains set during the first pass in the memory. When the skipping occurs, the method sets a reference bit for the next page in the page frame table, in response to having skipped replacement of the next page.

If the next page is copied into an application buffer, the method unsets the soft-pin bit of the next page.

Then, on a second pass of the page replacement function, if the reference bit is still set indicating the page was skipped on the first pass, the method replaces the next page on the second pass in the memory, even though the soft-pin bit remains set.

The computer-implemented system, method, and program product keeps read-ahead pages safe from being stolen by page replacement in memory while those pages have not yet been referenced by the application, by using the soft-pin bit in the page frame table. The soft-pin bit is a temporary, automatic pin of the page, which does not require that the application apply the pin the page. Instead, when the virtual memory manager (VMM) initiates read-ahead, all the read-ahead pages have the soft-pin bit automatically set by the VMM. While the soft-pin bit remains set, the page replacement algorithm will skip over this page. When the page is copied into the application buffer, then the soft-pin bit is unset thereby making the page available for page replacement.

When the page replacement algorithm starts to steal pages, it uses a two-pass mechanism. On the first pass it sets the reference bit and on the second pass if the reference bit is still set, it can steal the pages. Thus, the page replacement will skip over that page in the first pass if the soft-pin is set, and continue on. Since the two-pass method can work on a bucket basis, in which the memory is divided into buckets or smaller groups of memory and the two-pass page replacement method scans a bucket and then re-scans the same bucket, the soft-pin method allows page replacement to continue on to the next bucket. Once page replacement has scanned all the buckets, it will steal the page on the second pass, even though the soft-pin bit remains set.

The method gives the read-ahead pages a much better chance of staying in memory while at the same time preventing memory from being filled up with unstealable pages. Once the pages are read in by the application, the soft-pin bit is reset at that point so the pages can be stolen by the two-pass page replacement algorithm on the next pass.

DISCUSSION OF EXAMPLE EMBODIMENTS OF THE INVENTION

Figure 1:
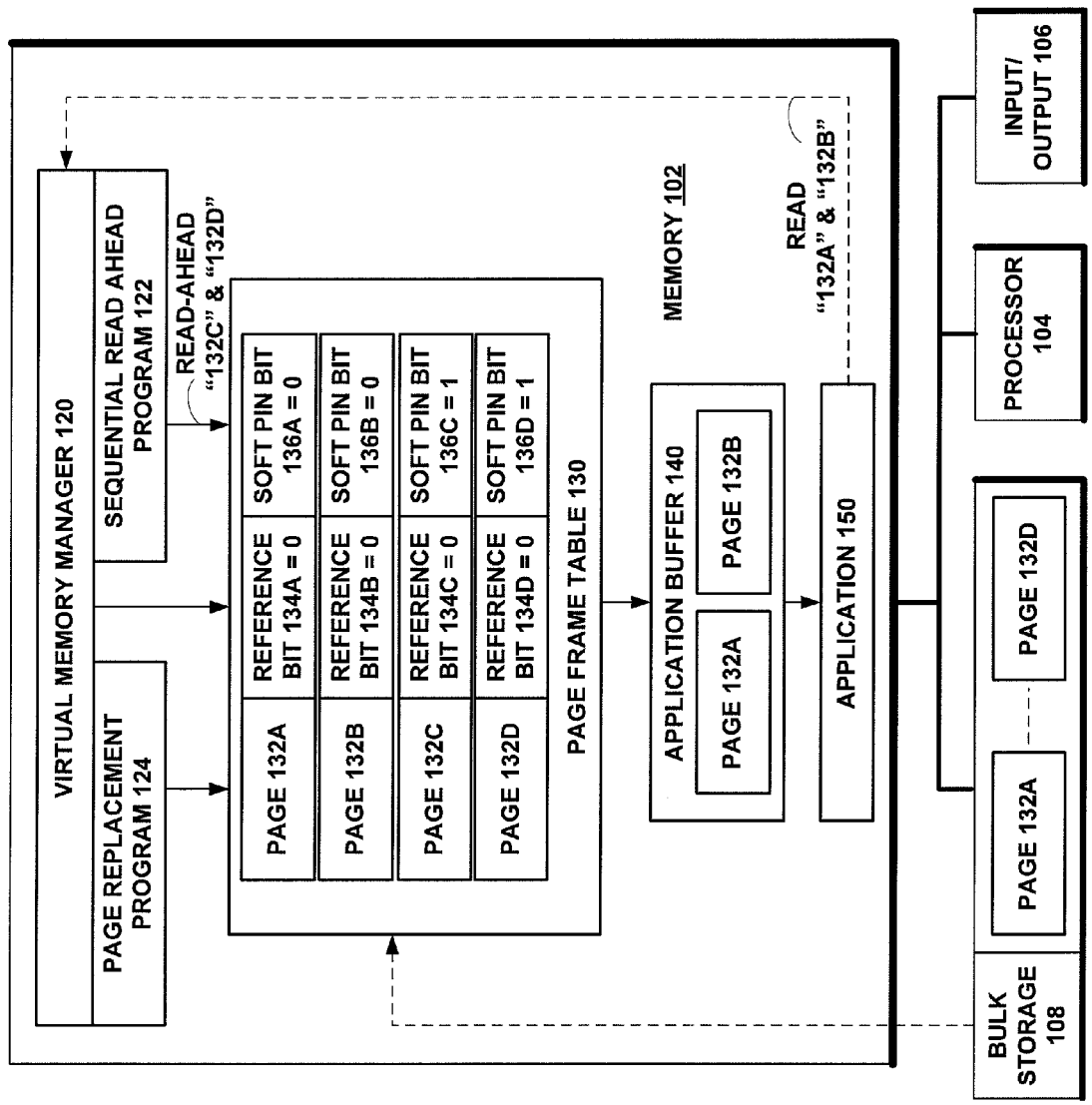
FIG. 1 is a functional block diagram of a computer system that performs preventing page replacement of unreferenced read-ahead file pages.

FIG. 1 is a functional block diagram of a computer system 100 that performs preventing page replacement of unreferenced read-ahead file pages 132C and 132D. The computer system 100 includes the memory 102 connected by a bus to the processor 104, the input/output interface 106, and the disk drive bulk storage 108 storing pages 132A, 132B, 132C and 132D. The memory 102 includes a virtual memory manager (VMM) 120, a sequential read-ahead program 122, a page replacement program 124, and the application program 150. The programs are sequences of computer program instructions that, when executed by the processor 104, carry out the functions of the system 100.

The virtual memory manager (VMM) 120 functions include detecting that a sequence of pages 132A, 132B is referenced by the application 150 to be read into the memory 102. The virtual memory manager (VMM) 120 continues by initiating a read-ahead to access by the sequential read-ahead program 122 of the a plurality of pages including the sequence of pages 132A, 132B that have been referenced and the next pages 132C, 132 D that have not yet been referenced by the application 150 nor read from the bulk storage 108, and storing the plurality in a page frame table 130 of the memory. During the read-ahead operation, the virtual memory manager (VMM) 120 sets a soft-pin bit 136C=1 for page 132C, sets a soft-pin bit 136D=1 for page 132D in the page frame table 130 corresponding to each of the unreferenced next pages 132C and 132D in the read-ahead operation. Each soft-pin bit 136C, 136D temporarily reserves its respective page 132C, 132 D from replacement by the page replacement function 124.

The view of the page frame table 130 in FIG. 1 shows the pages 132A, 132B, 132C and 132D after they have been read into the memory and pages 132A, 132B have been loaded onto the application buffer 140. Since pages 132A, 132B have been copied into the application buffer 140, the virtual memory manager (VMM) 120 has unset the soft-pin bit 136A=0 and unset the soft-pin bit 136B=0, so that these pages 132A, 132B will be subject to replacement on the first pass of the page replacement function 124. Since the page replacement function 124 has not yet made its first pass through pages 132A, 132B, 132C and 132D, the respective reference bits 134A, 134B, 134C, and 134D have a value of 0.

During a first pass of the page replacement function 124, the virtual memory manager (VMM) 120 skips the replacement of the next page 132C by the page replacement function 124, if its respective soft-pin bit 136C remains set (=1) during the first pass in the page frame table 130 of the memory 102. When the skipping occurs, the virtual memory manager (VMM) 120 sets the reference bit 134C=1 for the next page 132C in the page frame table 130, in response to the operation of skipping replacement of the next page 132C. Similarly, the virtual memory manager (VMM) 120 skips the replacement of the next page 132D by the page replacement function 124, if its respective soft-pin bit 136D remains set (=1) during the first pass. When the skipping occurs, the virtual memory manager (VMM) 120 sets the reference bit 134D=1 for the next page 132D in the page frame table 130, in response to the operation of skipping replacement of the next page 132D.

If the next page 132C is copied into the application buffer 140, the virtual memory manager (VMM) 120 unsets the soft-pin bit 136C=0 of the next page 132C. Then, on the next pass, page 132C will be subject to replacement by the page replacement function 124.

On a second pass of the page replacement function 124, if the reference bit 134C is still set (=1), the virtual memory manager (VMM) 120 replaces the next page 132C on the second pass in the page frame table 130 in the memory, even though the soft-pin bit 136C may remain set (=1).

In this manner, method gives the read-ahead pages a much better chance of staying in memory while at the same time preventing memory from being filled up with excess pages. Once the pages are read in by the application, the soft-pin bit is reset at that point so the pages can be stolen by the two-pass page replacement algorithm on the next pass.

Figure 2:
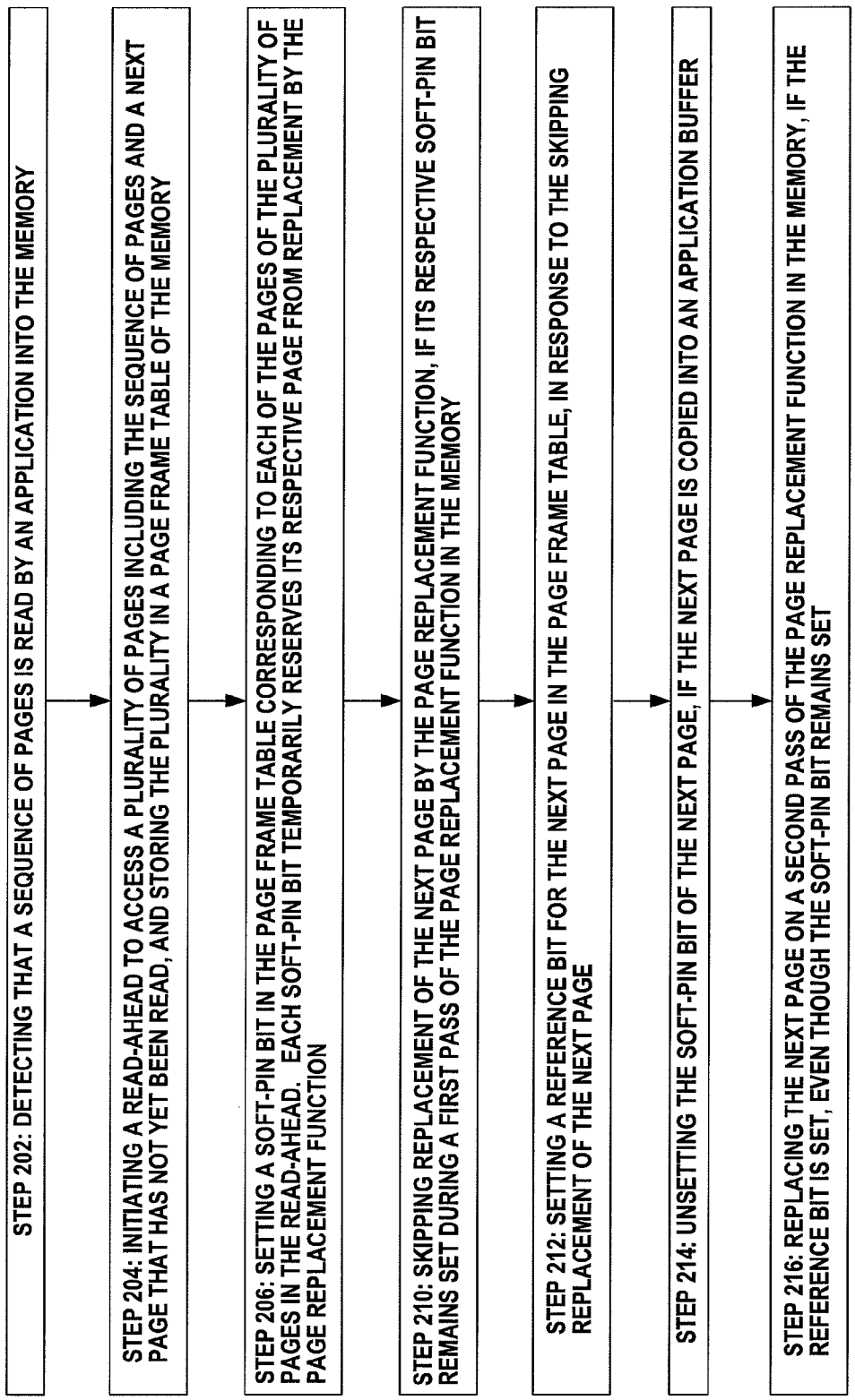
FIG. 2 is an example flow diagram of an example embodiment for the sequence of steps carried out by the computer system of FIG. 1.

FIG. 2 is a flow diagram of a computer-implemented method of managing memory pages in a memory, wherein the memory includes a page replacement function. The method includes the following steps:

Step 202: Detecting that a sequence of pages is read by an application into the memory.

Step 204: Initiating a read-ahead to access a plurality of pages including the sequence of pages and a next page that has not yet been read, and storing the plurality in a page frame table of the memory.

Step 206: Setting a soft-pin bit in the page frame table corresponding to each of the pages of the plurality of pages in the read-ahead. Each the soft-pin bit temporarily reserves its respective page from replacement by the page replacement function.

Step 210: Skipping replacement of the next page by the page replacement function, if its respective soft-pin bit remains set during a first pass of the page replacement function in the memory.

Step 212: Setting a reference bit for the next page in the page frame table, in response to the skipping replacement of the next page.

Step 216: Unsetting the soft-pin bit of the next page, if the next page is copied into an application buffer. and Step 216: Replacing the next page on a second pass of the page replacement function in the memory, if the reference bit is set, even though the soft-pin bit remains set.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments.

Although specific example embodiments have been disclosed, a person skilled in the art will understand that changes can be made to the specific example embodiments without departing from the spirit and scope of the invention.

What is claimed is:

1. A computer-implemented method of managing memory pages in a memory, wherein the memory includes a page replacement function, said method comprising:

detecting that a sequence of pages is read by an application into the memory;

initiating a read-ahead to access a plurality of pages including said sequence of pages and a next page that has not yet been read, and storing the plurality in a page frame table of the memory;

setting a soft-pin bit in the page frame table corresponding to each of the pages of the plurality of pages in the read-ahead;

each said soft-pin bit temporarily reserving its respective page from replacement by the page replacement function;

skipping replacement of the next page by the page replacement function, if its respective soft-pin bit remains set during a first pass of the page replacement function in the memory;

setting a reference bit for the next page in the page frame table, in response to said skipping replacement of said next page;

unsetting said soft-pin bit of the next page, if the next page is copied into an application buffer; and replacing the next page on a second pass of the page replacement function in the memory, if the reference bit is set, even though said soft-pin bit remains set.

\* \* \* \* \*